(12) United States Patent
Chu et al.

(10) Patent No.: US 6,740,843 B2
(45) Date of Patent: May 25, 2004

(54) METHOD AND APPARATUS FOR AUTOMATICALLY RE-IGNITING VACUUM ARC PLASMA SOURCE

(75) Inventors: Paul K. Chu, Kowloon (HK); Liuhe Li, Beiging (CN)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 10/243,084

(22) Filed: Sep. 12, 2002

(65) Prior Publication Data

US 2003/0226827 A1 Dec. 11, 2003

Related U.S. Application Data

(60) Provisional application No. 60/386,990, filed on Jun. 7, 2002.

(51) Int. Cl.[7] ................................................. B23K 9/00
(52) U.S. Cl. ............................ 219/121.57; 219/121.54; 219/121.59
(58) Field of Search ....................... 219/121.51, 121.57, 219/121.59, 121.36, 121.39, 121.4, 121.42, 121.43, 121.55, 130.4; 204/192.38, 298.38, 298.41

(56) References Cited

U.S. PATENT DOCUMENTS 4,906,811 A * 3/1990 Buil ...................... 219/121.59

* cited by examiner

Primary Examiner—Tu Ba Hoang
(74) Attorney, Agent, or Firm—Heslin Rothenberg Farley & Mesiti P.C.

(57) ABSTRACT

An apparatus and method are disclosed whereby if the arc in a DC or long-pulse AC vacuum arc plasma process (eg in vacuum deposition) starts to extinguish, this is automatically detected and a re-ignition process is activated. Detection of a tendency for the arc to extinguish is detected by monitoring the main power supply voltage, which will increase if the arc is extinguished.

14 Claims, 8 Drawing Sheets

METHOD AND APPARATUS FOR AUTOMATICALLY RE-IGNITING VACUUM ARC PLASMA SOURCE

This application claims priority from U.S. provisional patent application No. 60/386,990, filed Jun. 7, 2002.

FIELD OF THE INVENTION

This invention relates to methods and apparatus for automatically re-igniting a vacuum arc plasma source, in particular a direct current (DC) vacuum arc or a long pulse AC vacuum arc, and in particular to such methods and apparatus that are capable of enhancing vacuum arc deposition by minimizing pressure fluctuations in the deposition process.

BACKGROUND OF THE INVENTION

Vacuum metal arc deposition offers high deposition rates and produces dense coatings by the use of dense, energetic plasmas of electrically conducting elements. The high ion flux is created from minute, extremely hot, and discrete locations on the arc cathode known as cathode spots. In order to ignite the arc, a mechanical metal trigger can be used, but the ignition process may generate contamination that should preferably be avoided especially in semiconductor applications. Frequently, the arc plasma extinguishes during the deposition process, and in dual plasma deposition involving both gaseous and metallic elements, the chamber pressure can surge significantly within a few seconds after the arc extinction because a large amount of gas is bled in to react with the metallic ions in the cathodic plasma to produce the film. It is in practice very difficult to immediately adjust the gas flow after the arc extinction, and the sudden burst of gas may result in inhomogeneity in the composition and structure of the film. Thus, rapid re-ignition that can minimize this problem is desirable in many applications.

SUMMARY OF THE INVENTION

Apparatus for automatic re-ignition of a vacuum arc, comprising: (a) means for sensing a main power supply voltage, (b) means for generating an ignition signal, and (c) control means for controlling said ignition signal generating means in response to an output from said main power supply voltage sensing means whereby an ignition signal is generated when said main supply voltage is above a predetermined value.

Preferably the ignition signal generating means comprises a pulse generating means, wherein pulses generated by the generating means are used to control switch means for transferring stored energy from an energy storage means to a spark component, and wherein the control means controls the application of the pulses to the switch means.

In a first embodiment of the invention the pulse generating means generates a continuous series of pulses and the control means allows the pulses to be applied to the switch means only when the main power supply voltage is above the predetermined value.

In a second embodiment of the invention the control means causes the pulse generating means to generate pulses only when the main power supply voltage is above the predetermined value.

Preferably the switch means comprises a thyristor.

Since different cathodes and different plasma arcs may extinguish at different points, preferably the main power supply sensing voltage includes means for adjusting the predetermined voltage to a desired value. Preferably, the predetermined voltage is $fV_w$ where $V_w$ is the normal working voltage when the arc is established, and $V_i/V_w<f<1$ where $V_i$ is the idle voltage of the main power supply when the arc is extinguished. The main power supply voltage sensing means may comprise first and second resistors in series, and wherein f is determined by the values of the first and second resistors. One of the two resistors may be a variable resistor to provide the control of the value of the main power supply voltage considered to be indicative of arc extinction.

According to another broad aspect of the present invention there is provided a method for automatic re-ignition of a vacuum arc, comprising sensing a main power supply voltage, and generating an ignition signal when said main power supply voltage is above a predetermined value indicative of the arc becoming extinguished.

BRIEF DESCRIPTION OF THE DRAWINGS

Some embodiments of the invention will now be described by way of example and with reference to the accompanying drawings, in which:—

DETAILED DESCRIPTION OF PREFERRED EMBODIMENTS

The present invention, at least in its preferred forms, provides a method and apparatus that can be used in many types of DC vacuum arc sources in which the arc is ignited on a surface of the cathode. Normally, when a DC vacuum arc plasma is ignited, the arc plasma is driven to the front working surface under the influence of the magnetic field. As will be seen in more detail from the following description of preferred embodiments, at least in its preferred forms the present invention provides a method and apparatus for automatically re-igniting a direct current (DC) vacuum arc plasma source when the arc plasma dies out during the deposition or even when the arc plasma tends to extinguish, thus sustaining a continuous arc plasma. This has the advantage of avoiding fluctuation of the deposition pressure that occurs after arc extinction and to eliminate the inhomogeneity in the composition and structure of the film by rapidly re-igniting. Furthermore the present invention provides an apparatus which can ignite the arc plasma at the beginning without using a mechanical trigger. In addition to re-igniting a DC vacuum arc, the present invention could also be applied to the automatic re-ignition of a long-pulse (eg more than 0.5 s) AC vacuum arc.

The present invention is particularly useful in an apparatus for producing vacuum arc plasma in a dual plasma deposition configuration. The arc in the deposition is really composed of many "small spots" on the cathodic surface. When the arc tends to extinguish, some of the cathodic spots die out firstly and the voltage of the arc plasma will increase. Considering that the main power supply typically resembles a traditional welding power supply having a high electrical inductance, the arc current cannot go to zero abruptly and the arc voltage has a finite ramp rate. The automatically re-igniting device is designed to send the re-igniting pulse immediately when the arc voltage increases to $fV_w$, where $V_w$ is the working voltage, f is the arc voltage increase with a value between 1 and $V_i/V_w$, and $V_i$ is the idle voltage of the main power supply. Hence, the re-ignition signal can be sent to the cathode just before the arc completely extinguishes. Consequently, with the implementation of this hardware, the deposition process is much smoother and arc extinction can hardly be noticed in most cases. In this way, the arc plasma is re-ignited automatically and plasma extinction can be avoid successfully. This also takes effect at the beginning of the arc.

Figure 1:
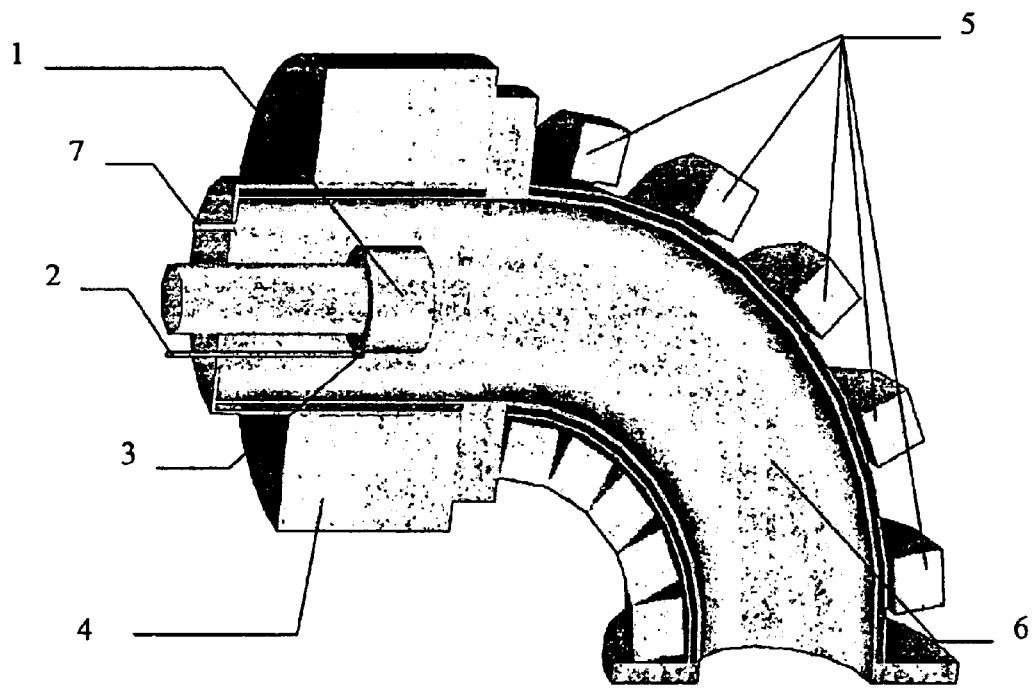
FIG. 1 shows a DC vacuum arc plasma source fitted with a 90° magnetic solenoid filter with which an embodiment of the present invention may be applied.

FIG. 1 shows an example of a vacuum arc plasma source suitable for use with the present invention. The vacuum arc plasma source is fitted with a 90° magnetic solenoid filter. The water-cooled vacuum arc plasma source consists of a cathode 1 60 mm in diameter, an ignition electrode 2, and a spark component 3. The arc is initiated on the side surface of the cylindrical cathode 1, and copper, titanium and graphite are respectively used as cathode materials. The focusing coils 4 produce a magnetic field, and the filter coils 5 produce a filtering magnetic field in the center of the coils. The stainless steel quarter-torus 6 has an internal duct with an inside diameter of 125 mm. Argon is introduced through an inlet 7 at a flow rate of 40 sccm as a background gas and the pressure was $9.3 \times 10^{-2}$ Pa. The main power supply provides up to 300A of arc current at 30~40 V. The open-circuit voltage of the power supply is 70V.

Figure 2:
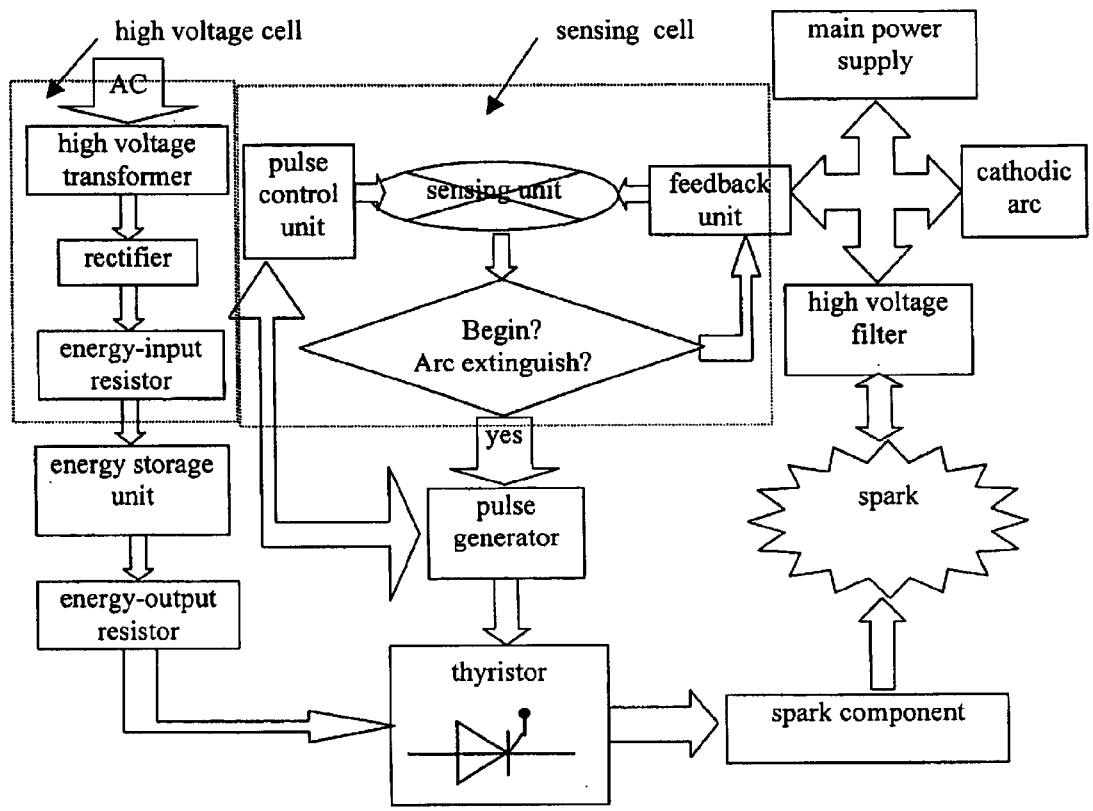
FIG. 2 shows a flow chart illustrating the method according to an embodiment of the present invention.

FIG. 2 is a flow chart illustrating the method of a preferred embodiment of the present invention. As will be described in more detail below, when the main power supply is ready to ignite an arc at the beginning of a deposition process, or when the arc has a tendency to extinguish or when it has in fact become extinguished, the increased voltage demanded by the DC vacuum arc plasma is detected by a feedback unit of the auto-re-ignition system. A square wave signal is then sent to a pulse generator by a sensing cell and then high frequency pulses are sent to the thyristor grid. An energy storage unit that is charged repetitively by a high voltage cell, which includes a high voltage transformer, rectifier and energy-input resistor, produces the sparking energy in response to the high frequency pulses. When the gate of the thyristor is excited, a high voltage is supplied between the igniting electrode and cathode. The spark generated by the spark component subsequently ignites the cathodic arc and the thyristor switches off automatically when the current drops below the holding value.

Figure 3:
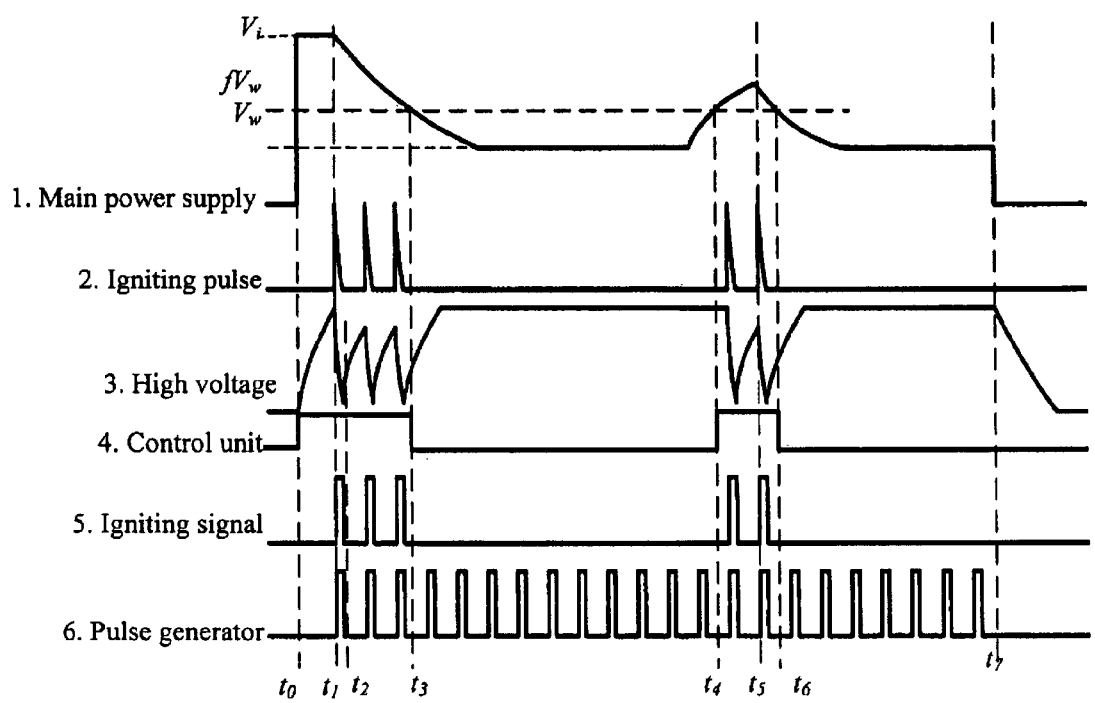
FIG. 3 shows the waveform sequences of the main power supply and automatic re-triggering system in a first embodiment of the invention.

FIG. 3 displays the sequence of waveforms of the main power supply and auto-re-trigger system in a first embodiment of the invention. When the main power supply is switched on at time $t_0$, the high voltage cell is also switched on at the same time, and the energy storage unit is charged. Line 3 in FIG. 3 shows the energy storage voltage waveform. The pulse generator is automatically switched on after a delay time of $t_1-t_0$ (line 6). At $t_1$, the pulse generator begins to produce stable pulses (line 6) that continue for the whole deposition process, though these pulses are only applied to the thyristor to generate an igniting signal when the output of the pulse control unit is high, which occurs when the sensing cell detects that the voltage of the main power supply is at a voltage that is over a given voltage $fV_w$, this is shown in line 4. When the pulse control unit has an output that is high, the pulses generated by the pulse generator are added to the thyristor grid as shown by line 5 in FIG. 3 to create an igniting signal. The capacitor in the energy storage unit discharges until the current drops to a value low enough to switch off the thyristor at time $t_2$. After $t_2$, the energy storage unit is recharged and the recharge-discharge states alternate. The igniting pulses do not stop until the voltage of the main power supply drops below $fV_w$ which means that the spark component keeps sparking to sustain the arc if the voltage of the main power supply is higher than $fV_w$. At $t_3$, the arc is in a steady state and the output of control unit switches to low so that pulses generated by the pulse generator are filtered out and do not reach the thyristor and no igniting pulses are generated.

During the deposition process, if the arc shows sign of extinguishing, the voltage of the main power supply will increase. As soon as the sensing cell detects that the main power supply voltage is higher than $fV_w$ (for example, at time $t_4$), the output of the pulse control unit is switched to high and lets the pulses generated by the pulse generator reach the thyristor so as to generate an ignition signal and ignition pulses are once more sent to the spark component. When the arc is re-ignited, for example at time $t_5$, the voltage of the main power supply decreases again, and at time $t_6$, the output of the pulse control unit switches to low and no ignition signal is generated. This completes one auto-re-ignition cycle. When the deposition process is over at time $t_7$, the entire deposition system is switched off, and the energy storage unit discharges slowly.

Figure 4:
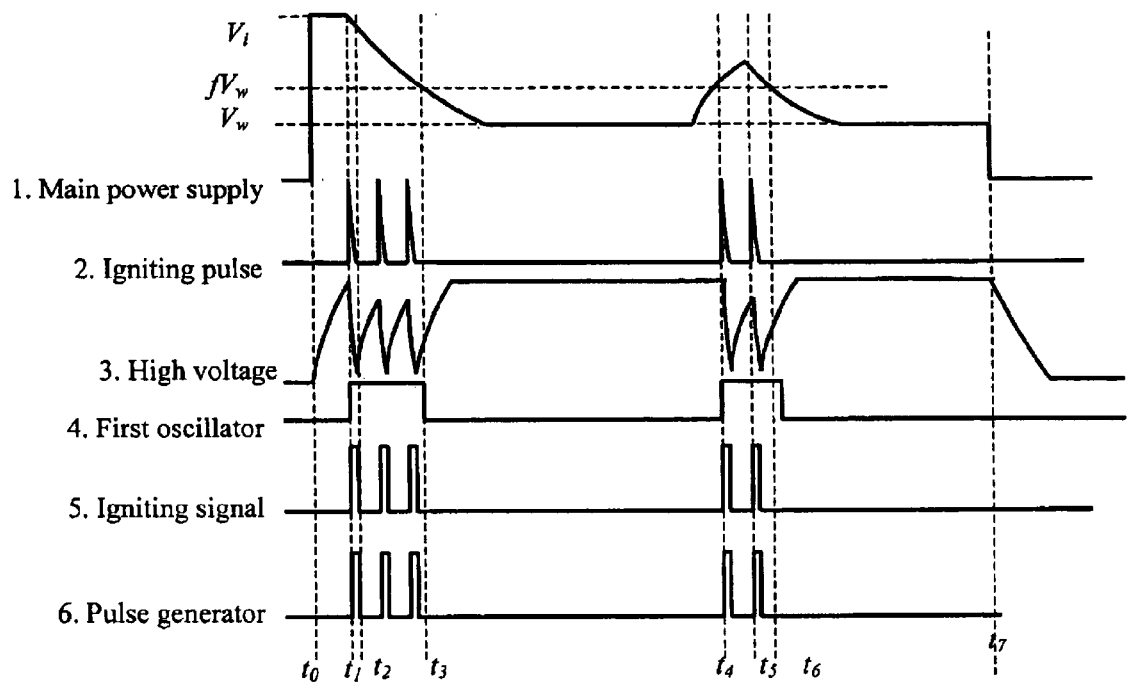
FIG. 4 shows the waveform sequences of the main power supply and automatic re-triggering system in a second embodiment of the invention.

In this first embodiment of the invention, the pulse generator continually generates pulses, but they are only applied to the thyristor under the control of the pulse control unit when the main power supply voltage goes above a predetermined level. However other designs are also possible. In particular, in a second embodiment of the invention the pulse generator can be combined with the pulse control unit and become a pulse-tone oscillator consisting of two astable multi-vibrators. In this embodiment the pulse generator only oscillates during the duration of a period defined by the pulse control unit. FIG. 4 shows the sequence of waveforms of this embodiment and it will be seen that the main difference between FIGS. 4 and 3 is that in FIG. 4 the pulse generator does not continue to oscillate after time $t_3$ when the first oscillator switches to low. At time $t_4$, the first oscillator switches to high (line 4), and the pulse generator begins once more to send out the pulses at the same time. The igniting format shown in FIG. 4 is the same as that of FIG. 3. At $t_0$, the high voltage storage unit is charged (line 3). At $t_1$, the first oscillator switches to high (line 4), and the pulse generator begins to oscillate at the same time (line 6). At time $t_3$, the arc voltage drops to $fV_w$, and the first oscillator stops (line 4). It becomes low and the pulse generator stops oscillating (line 6). When the feedback unit finds that the arc voltage is higher than $fV_w$, the first oscillator becomes high and the second oscillator (pulse generator) sends out the igniting pulses.

Figure 5:
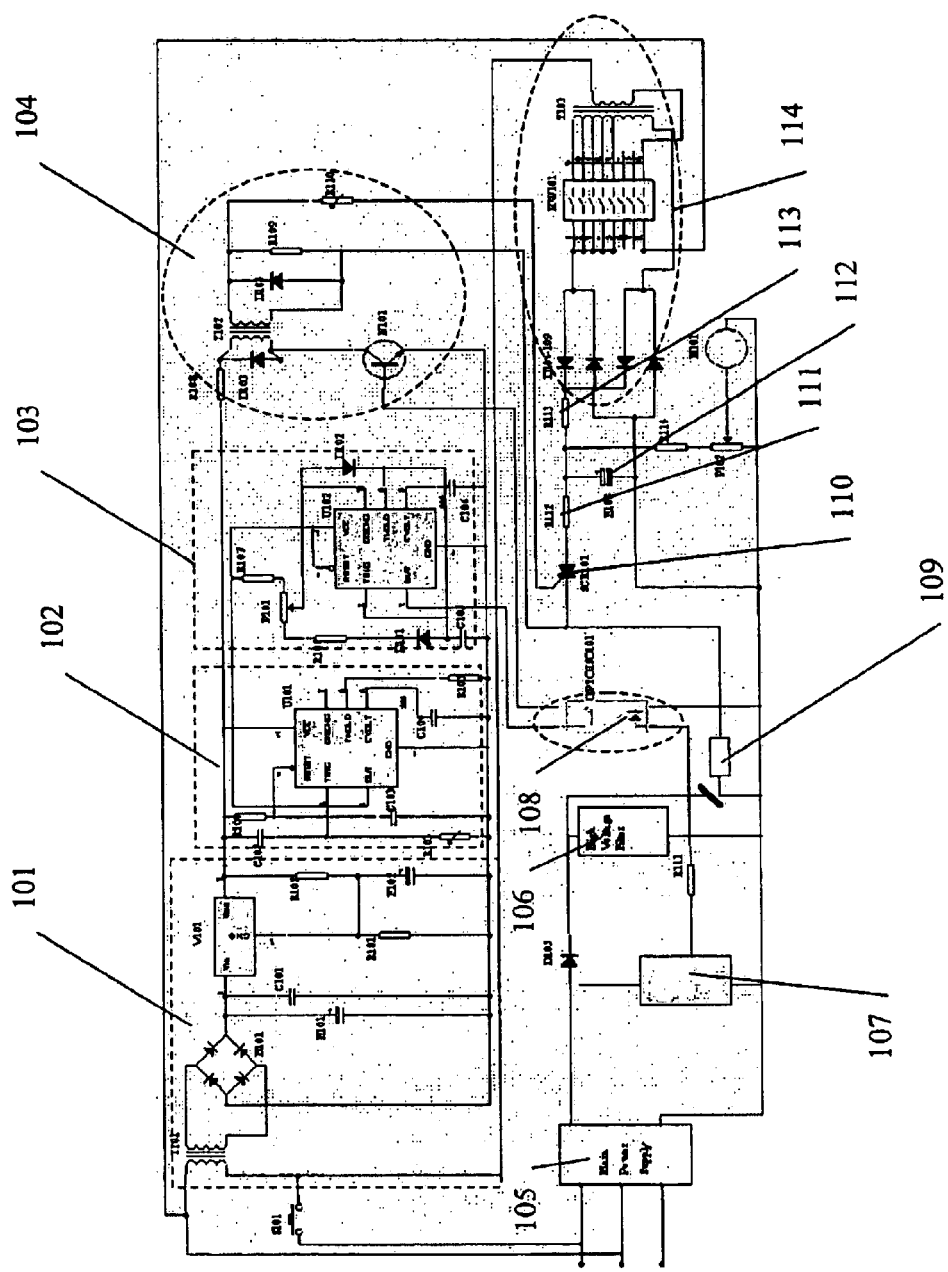
FIG. 5 shows a schematic of one possible circuit for implementing the embodiment of FIG. 3.

FIG. 5 illustrates a circuit for implementing an embodiment of the automatic re-igniting system according the sequence shown in FIG. 3. The main power supply 105 and the auto-re-igniting system supply 101 are switched on at the same time. Because it takes some time for the high voltage unit 114 to charge to a high voltage state, the thyristor 110 should not be switched on just at the beginning, and the delay timer 102 is used as the power supply of the pulse generator 103. The delay time of 102 is determined by the resistor R103 and C102. When the output of 102 becomes high, pulse generator 103 begins to oscillate during the whole deposition period. Pulse transformer unit 104 is used to feed a signal to the high voltage pulse thyristor 110. The transformer can isolate the control system with the high voltage system and can filter out harmful high voltage noise.

When the main power supply 105 is turned on, the sensing unit 107 and the pulse control unit (Opto-isolator) 108 open the gate and let the oscillating signal produced by 103 to go through. The oscillating pulses are produced by 103 and controlled by 108. The pulse transformer T102 is turned on and off alternately by 103 through the Darlington transistor N101. Controlled by the energy-input resistor 113, the energy storage unit 112 is charged by the high voltage unit 114. Controlled by energy-output resistor 111, energy storage unit 112 gives out spark energy to the spark component 109 when the high voltage thyristor SCR101 is opened. To avoid high voltage induced damage to the main power supply, a high voltage filter 106 is used.

Figure 6:
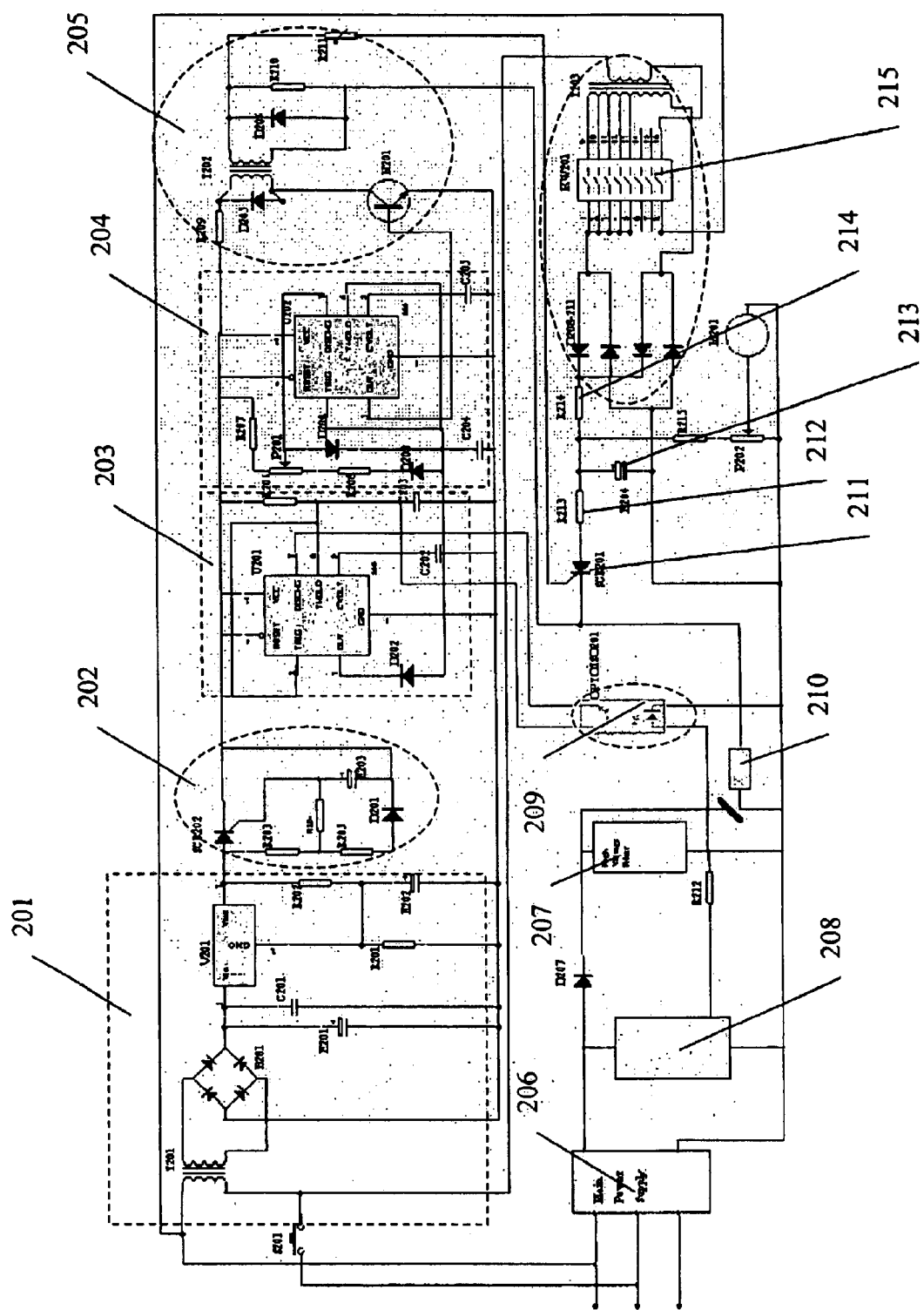
FIG. 6 shows a schematic of one possible circuit for implanting the embodiment of FIG. 4.

FIG. 6 illustrates a possible circuit for implementing an embodiment of the invention according to-the sequence shown in FIG. 4. The delay-timer unit 202 is made of a delay-excited thyristor, several resistors, a diode, and a capacitance, though any other conventional form of delay timer may be used. The oscillation of the first oscillator 203 is subjected to 202 and the pulse control unit (Opto-isolator) 209. When the sensing unit 208 finds that the output voltage of main power supply 206 is higher than $fV_w$, 209 holds the capacitance in an uncharged state via the discharge terminal of U201 (555 timer). When the terminal output of U201 is high, interconnected diode D202 is reverse biased, thereby allowing C204 to charge. U202 (555 timer) oscillates during the duration of the output pulse from U201 is which controlled by the pulse control unit 209. The Darlington transistor N201 is directly subjected to the output voltage of the pulse generator unit 204.

201 is the power supply of the control system, and 205 is pulse transformer unit. 206 is main power supply, 208 is the sensing unit, 207 is high voltage filter, and 210, 211, 212, 213, 214, 215 are spark components, high voltage pulse thyristor, energy-output resistor, energy storage unit, energy-input resistor, and high voltage unit, respectively.

Figure 7:
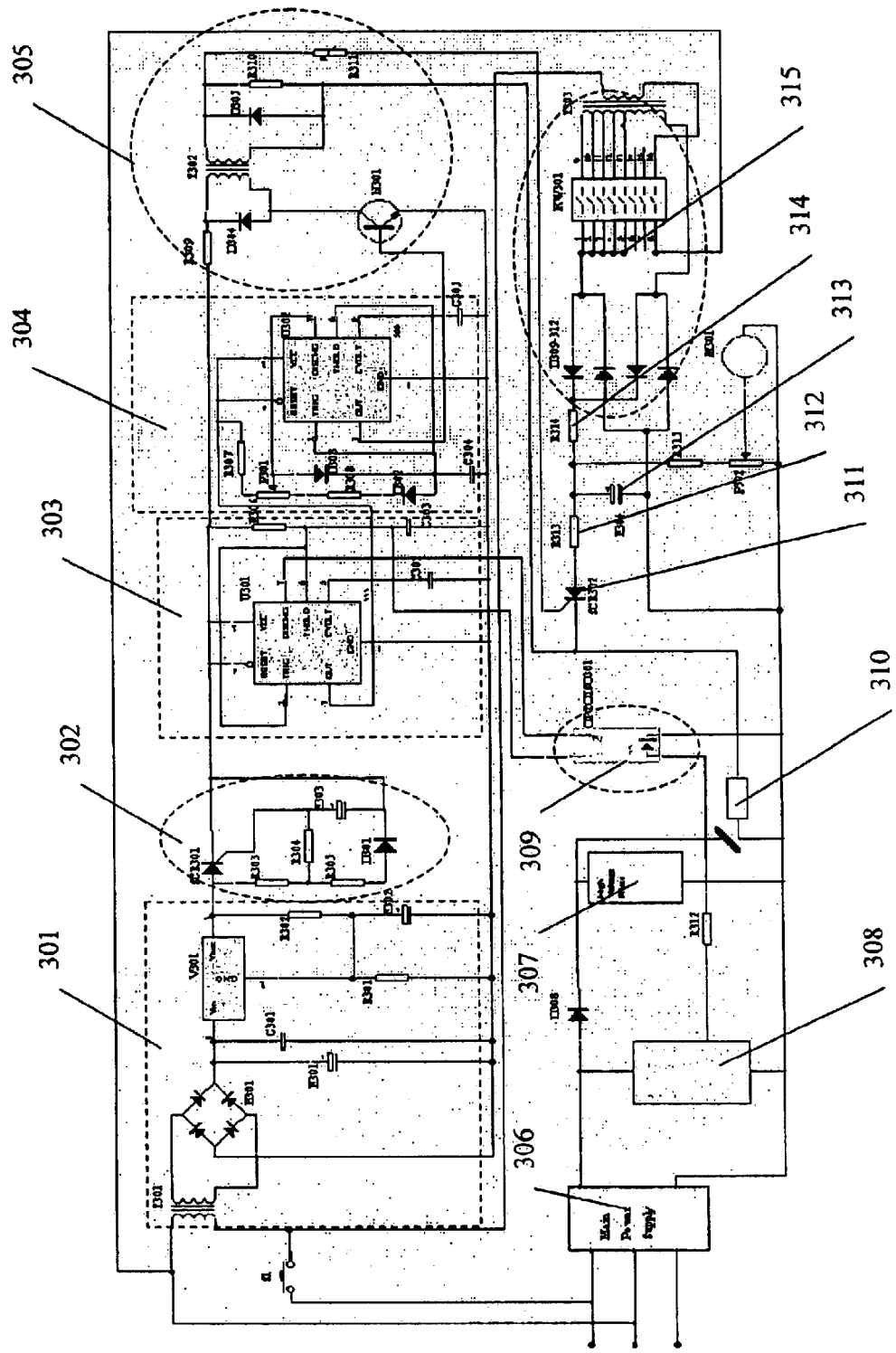
FIG. 7 shows a modification of the circuit of FIG. 6.

FIGS. 5 and 6 show example circuits for possible implementation of embodiments of the present invention. By making small changes, other types of circuitry can be used in this auto-re-igniting scheme. FIG. 7 shows another possible circuit that is derived from FIG. 6. The only difference between FIG. 6 and FIG. 5 is that the interconnecting diode D202 in FIG. 5 has been removed. The first oscillator 303 supplies power to pulse generator 304. That is, 304 only oscillates during the "switch-on" duration of 303.

To enhance dual vacuum arc deposition, the resistance of the "energy-input" resistor and the "energy-output" resistor is important. The energy-input resistor determines the charging speed of the energy storage unit and so the resistance cannot be too high. The energy-output resistor determines the discharging speed of the energy storage unit, and its resistance should not be too high either. However, the total electrical resistance of the energy-input resistor and the energy-output resistor should not be so low that the thyristor cannot be shut down automatically. In addition, a high voltage filter should preferably be added to the system to avoid breakdown of the rectifying components in the main power supply due to the high voltage pulses. Using a careful design such as the one described here, the arc can be automatically re-ignited before extinguishing completely. The time for which the arc voltage and arc current fluctuate is limited to the interval $t_6$–$t_4$, and thus the fluctuation in the vacuum pressure induced by arc extinction and the subsequent detrimental effects can be effectively avoided.

Figure 8:
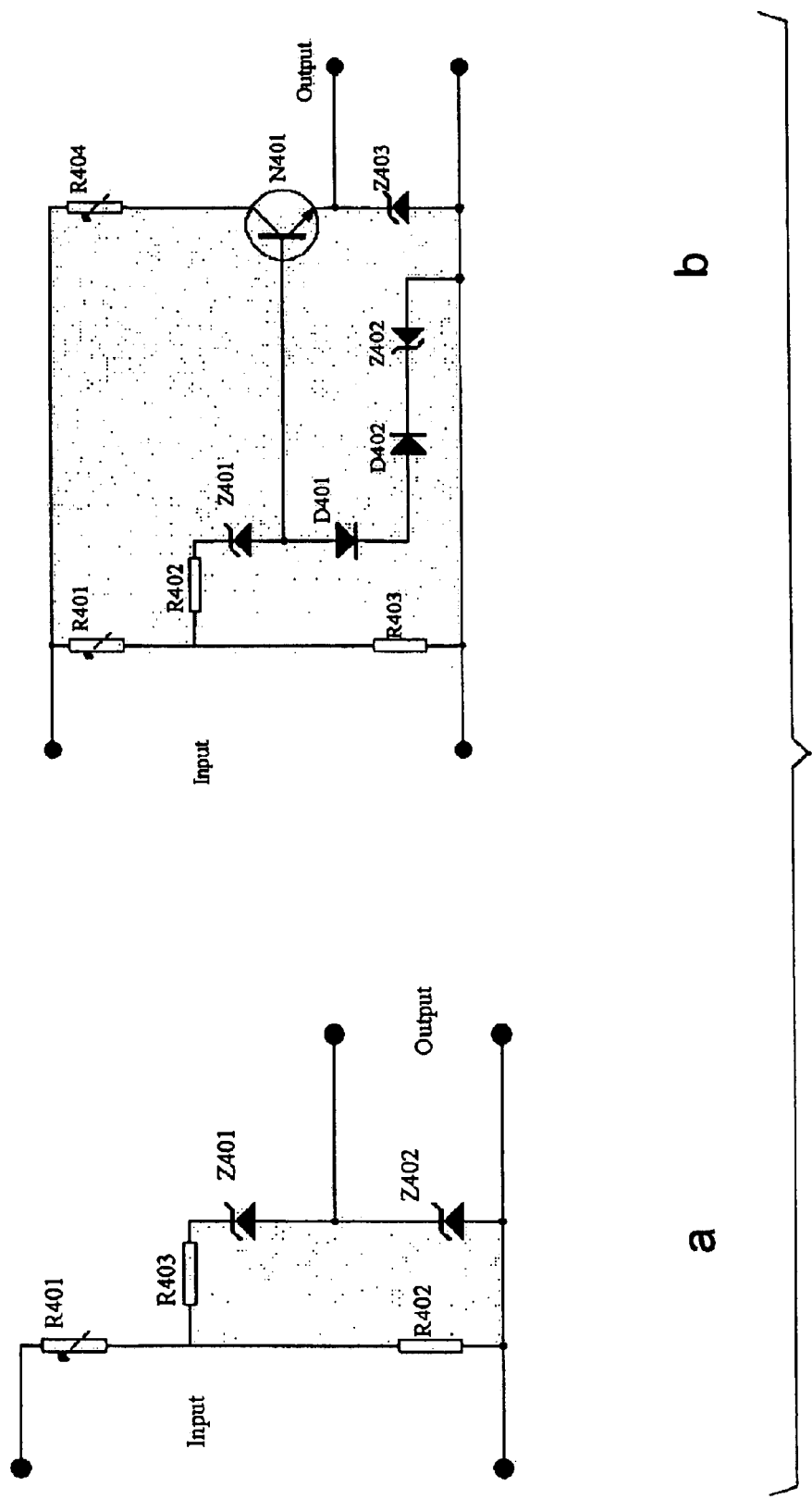
FIG. 8 shows two schematic circuits of possible sensing units for use in embodiments of the present invention.

A key component in the auto-re-igniting process is the sensing cell. Because different cathode materials possess different optimal operating voltages, the sensing cell must allow for manual adjustment of the voltage at which the re-ignition process is started. In addition, in order to accommodate the rapid pressure change, the sensing cell must have a high response speed. FIGS. 8($a$) and 8($b$) illustrate two possible forms of the sensing circuit for use in embodiments of the present invention. The resistors R401 and R402 determine the coefficient f From the circuit shown in FIG. 8($a$), $$fV_w/(Uz_{401}+U_{output})=(R_{401}+R_{402})/R_{402}$$

$$f=(Uz_{401}+U_{output})(R_{401}+R_{402})/(R_{402}V_w)$$

$V_w$ is a variable for different cathode or different arc plasma current. R401 is a variable resistance and this can be set manually depending on the nature of the cathode used and the desired arc plasma current. Because the output voltage of the circuit shown in FIG. 8($a$) is subject to the output resistance, a modified circuit is shown in FIG. 8($b$). In FIG. 8($b$) transistor N401 acts as a switch to supply the output voltage and current. When the transistor is "on", for example when the arc is extinguished, the circuit shown in FIG. 8($b$) can supply a higher driving current than the circuit in FIG. 8($b$) leading to a sharper rise (ie a higher slew rate) and a faster reaction speed.

What is claimed is:

1. Apparatus for automatic re-ignition of a vacuum arc, comprising:
    (a) means for sensing a main power supply voltage,
    (b) means for generating an ignition signal,
    (c) control means for controlling said ignition signal generating means in response to an output from said main power supply voltage sensing means whereby an ignition signal is generated when said main supply voltage is above a predetermined value, and
    wherein said predetermined voltage is $fV_w$ where $V_w$ is the normal working voltage when the arc is established, and f is a coefficient determined by $V_i/V_w$<f<1 where $V_i$ is the idle voltage of the main power supply when the arc is extinguished.

2. Apparatus as claimed in claim 1 wherein said ignition signal generating means comprises a pulse generating means, wherein pulses generated by said generating means are used to control switch means for transferring stored energy from an energy storage means to a spark component, and wherein said control means controls the application of said pulses to said switch means.

3. Apparatus as claimed in claim 2 wherein said pulse generating means generates a continuous series of pulses and said control means allows said pulses to be applied to said switch means only when said main power supply voltage is above said predetermined value.

4. Apparatus as claimed in claim 2 wherein said control means causes pulse generating means to generate pulses only when said main power supply voltage is above said predetermined value.

5. Apparatus as claimed in claim 2 wherein said switch means comprises a thyristor.

6. Apparatus as claimed in claim 1 wherein said main power supply sensing voltage includes means for adjusting said predetermined voltage to a desired value.

7. Apparatus as claimed in claim 1 wherein said main power supply voltage sensing means comprises first and second resistors in series, and wherein f is determined by the values of the first and second resistors.

8. Apparatus as claimed in claim 7 wherein one of the two resistors is a variable resistor.

9. A method for automatic re-ignition of a vacuum arc, comprising:

sensing a main power supply voltage, and generating an ignition signal when said main power supply voltage is above a predetermined value indicative of the arc becoming extinguished and before the arc completely extinguishes.

10. A method as claimed in claim 9 wherein said ignition signal is generated by applying pulses to controls the transfer of energy from an energy storage means to a spark component, and wherein energy is transferred to said spark component when the main power supply voltage is above said predetermined level.

11. A method as claimed in claim 10 wherein a continuous series of pulses are generated, and wherein said pulses are only applied to control the transfer of energy when the main power supply voltage is above said predetermined level.

12. A method as claimed in claim 10 wherein said pulses are only generated when the main power supply voltage is above said predetermined level.

13. A method as claimed in claim 9 wherein said predetermined value is chosen by a user depending on the parameters of at least one of a cathode and an arc plasma.

14. A method as claimed in claim 9 wherein said predetermined voltage is $fV_w$ where $V_w$ is the normal working voltage when the arc is established, and f is a coefficient determined by $V_i/V_w < f < 1$ where $V_i$ is the idle voltage of the main power supply when the arc is extinguished.

* * * * *

UNITED STATES PATENT AND TRADEMARK OFFICE
CERTIFICATE OF CORRECTION

PATENT NO. : 6,740,843 B2  
DATED : May 25, 2004  
INVENTOR(S) : Chu et al.

It is certified that error appears in the above-identified patent and that said Letters Patent is hereby corrected as shown below:

<u>Title page</u>,
Item [75], Inventors, delete "Beiging" and insert -- Beijing --

Signed and Sealed this

Twentieth Day of July, 2004

JON W. DUDAS  
*Acting Director of the United States Patent and Trademark Office*